United States Patent
Froeberg

(10) Patent No.: US 7,580,791 B2
(45) Date of Patent: Aug. 25, 2009

(54) ROUTE EVALUATION SYSTEM

(75) Inventor: Peter L. Froeberg, Cupertino, CA (US)

(73) Assignee: RM Acquisition, LLC, Skokie, IL (US)

( * ) Notice: Subject to any disclaimer, the term of this patent is extended or adjusted under 35 U.S.C. 154(b) by 425 days.

(21) Appl. No.: 11/200,975

(22) Filed: Aug. 10, 2005

(65) Prior Publication Data

US 2007/0038367 A1 Feb. 15, 2007

(51) Int. Cl.
*G01C 21/30* (2006.01)
(52) U.S. Cl. ....................... 701/202; 340/988
(58) Field of Classification Search ................ 701/200, 701/202, 207–211; 73/178 R; 340/988, 340/990, 995
See application file for complete search history.

(56) References Cited

U.S. PATENT DOCUMENTS

| 5,654,892 | A | | 8/1997 | Fujii et al. |
| 5,862,509 | A | * | 1/1999 | Desai et al. ............... 701/209 |
| 5,913,919 | A | * | 6/1999 | Bauer et al. ................ 701/301 |
| 6,029,173 | A | | 2/2000 | Meek et al. |
| 6,240,342 | B1 | * | 5/2001 | Fiegert et al. ................. 701/25 |
| 6,259,988 | B1 | * | 7/2001 | Galkowski et al. .......... 701/202 |
| 6,366,927 | B1 | | 4/2002 | Meek et al. |
| 7,167,180 | B1 | * | 1/2007 | Shibolet ..................... 345/474 |
| 2005/0209772 | A1 | * | 9/2005 | Yoshikawa et al. .......... 701/200 |
| 2005/0246096 | A1 | * | 11/2005 | Bracht et al. ................ 701/211 |

FOREIGN PATENT DOCUMENTS

WO WO93/05492 A1 * 3/1993

* cited by examiner

*Primary Examiner*—Dalena Tran
(74) *Attorney, Agent, or Firm*—Marshall, Gerstein & Borun LLP

(57) ABSTRACT

A route evaluation system includes a processor, a computer readable memory and a database that stores roadway data pertaining to a route. A first routine is arranged to obtain selected roadway data from the database. A second routine is arranged to determine a route from an origin to a destination based at least in part on the roadway data. A third routine is arranged to compute a set of navigation parameters for the route. A fourth routine is arranged to compare the set of navigation parameters to at least one vehicle maneuverability parameter of a vehicle.

74 Claims, 10 Drawing Sheets

*VEHICLE MANEUVERABILITY PARAMETERS*

LENGTH
WIDTH
HEIGHT
POWER
BRAKES
WEIGHT
TURN RADIUS

*NAVIGATION PARAMETERS*

ROAD WIDTH
CURVATURE
GRADE
WEIGHT BEARING CAPACITY
OVERPASSES
LOCAL ORDINANCES

| ROUTE # | DESCRIPTION | SCORE | MINI MAP | DIST. | TIME |
|---------|-------------|-------|----------|-------|------|
| 1 | MAIN ST - EAST DR - SOUTH ST ... | 85 |  344  342 | 4.2 | 8 |
| 2 | 2nd ST - A AVE - 3rd ST ... | 72 |  344  342 | 2.5 | 5 |
| 3 | 2nd ST - A AVE - EAST DR ... | 60 |  344  342 | 3.6 | 7 |
|   |   |   |   |   |   |
|   |   |   |   |   |   |
|   |   |   |   |   |   |

FIG. 7

VEHICLE MANEUVERABILITY PARAMETERS

- LENGTH
- WIDTH
- HEIGHT
- POWER
- BRAKES
- WEIGHT
- TURN RADIUS

NAVIGATION PARAMETERS

- ROAD WIDTH
- CURVATURE
- GRADE
- WEIGHT BEARING CAPACITY
- OVERPASSES
- LOCAL ORDINANCES

FIG. 10

| ROUTE # | CODE | EQUIP AVAILABLE | DRIVER AVAILABLE |
|---------|------|-----------------|------------------|
| 1 | L-Y,S-G | L | EX |
| 2 | L-X,S-Y | S | NO |
| 3 | L-G,S-G | | |
| 4 | L-R,S-G | | |

L = LARGE    G = GREEN    X = NOT USABLE
S = SMALL    Y = YELLOW    EX = EXPERIENCED
               R = RED       NO = NOVICE

ROUTE EVALUATION SYSTEM

FIELD OF THE DISCLOSURE

The present disclosure generally relates to navigation systems. More specifically, the present disclosure relates to a navigation system that determines and then evaluates a route for a vehicle.

BACKGROUND

Couriers, delivery and transportation companies need to determine the best route from an origin, such as a distribution center or a pick up point, to a destination, such as a delivery address. Currently, these organizations use navigation software and navigation databases to plan a route from the origin to the destination. For operations involving large trucks, several commercial databases are available which include information that enhances route planning. For example, a database may include roadway information such as weight bearing capacity, speed limit, and the presence of absence of dedicated turn lanes, among other information.

Commercially available route planning software and databases may lack certain types of information and/or route planning functionalities. For example, in many circumstances the destination is not located along a roadway included in the database, but instead the actual destination is located a mile or more from the "destination" stored in the database. This problem has come to be known within the transportation industry as the "last mile" problem.

Many times, a driver or vehicle operator nearing the actual destination encounters a problem that is not accounted for in the database. Because of the lack of information for the final portion of the route, many less precise and subjective methods have been developed in an effort to determine the navigability of the "last mile" of the route. These methods may include a subjective analysis of secondary attributes, such as, for example analyzing the Department of Transportation road classification, analyzing the name of the road (e.g. whether the road is a "Boulevard" or a "Lane"), analyzing the depiction of the route on a map (e.g. whether the route appears as a heavy line as opposed to a thin line), etc. Nevertheless, the approach described above does not always produce reliable results and may plan a route with sections which are impassable by certain vehicles. Additional techniques may be desired to determine if the "last mile" of a route is likely to be suitable for a particular vehicle.

SUMMARY

A first aspect of a route evaluation system may include a processor, a computer readable memory and a database that stores roadway data pertaining to a route. A first routine is stored in the memory, executable by the processor, and arranged to obtain selected roadway data from the database. A second routine is stored in the memory, executable by the processor, and arranged to determine a route from an origin to a destination based at least in part on the roadway data. A third routine is stored in the memory, executable by the processor, and arranged to compute a set of navigation parameters for the route. A fourth routine is stored in the memory, executable by the processor, and arranged to compare the set of navigation parameters to at least one vehicle maneuverability parameter.

A second aspect of the route evaluation system may include a set of vehicle maneuverability parameters arranged for storage on a computer readable medium and a set of roadway data arranged for storage on a computer readable medium. Further, a first routine may be executable by a processor and arranged to determine a selected route from an origin to a destination based at least in part on the set of roadway data. Still further, a second routine may be executable by a processor and arranged to determine a set of route navigation parameters based on the roadway data for a selected route, the set of route navigation parameters may be indicative of the suitability of the selected route.

A third aspect of the route evaluation system is a set of vehicle maneuverability parameters arranged for storage on a computer readable medium, a first routine executable by a processor and arranged to access a set of roadway data stored in a database and to determine a selected route from an origin to a destination based on the set of roadway data. Additionally, a second routine may be included which is executable by the processor and arranged to determine a set of route navigation parameters based on the roadway data pertaining to the selected route, the set of route navigation parameters is indicative of the suitability of the selected route.

The route evaluation system may be incorporated into an overall system that includes a vehicle, a computer and a communication device placeable in the vehicle and which communicates with the computer.

The route evaluation system may also be incorporated into a dispatch system that includes a computer and a communication device that allows communication with the vehicle.

Additionally, a method of evaluating a route includes the steps of defining a geographical area on a computer, retrieving roadway data from a database for the geographical area, creating a route from an origin to a destination within the geographical area, evaluating navigation parameters of the route and comparing the navigation parameters of the route to vehicle maneuverability parameters of a vehicle.

BRIEF DESCRIPTION OF THE DRAWINGS

FIG. 7 is an exemplary listing of vehicle maneuverability parameters and route navigation parameters.

FIG. 10 is an exemplary display for a dispatch computer generated by the route evaluation system of FIG. 1.

DETAILED DESCRIPTION

Figure 1:
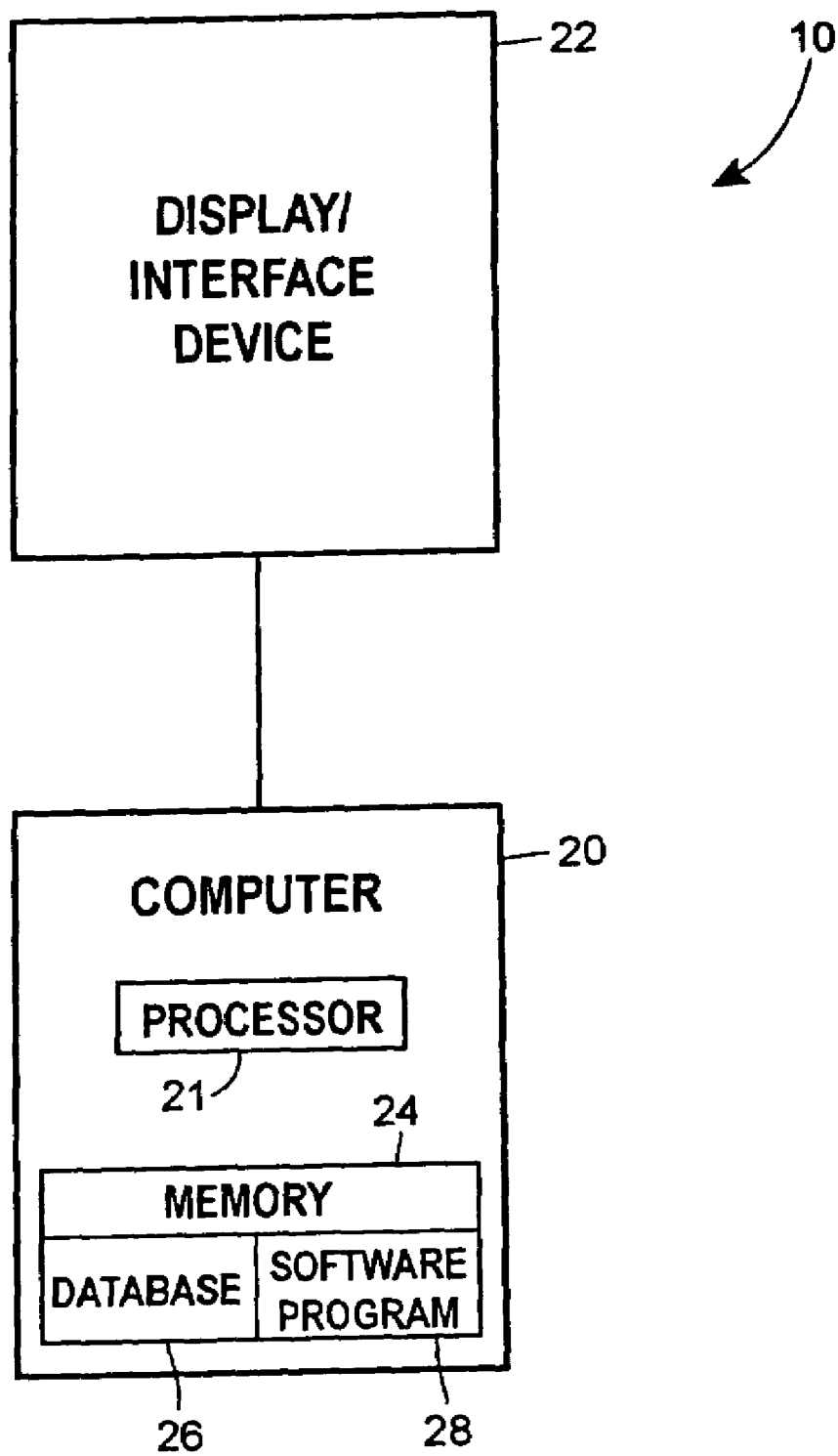
FIG. 1 is an architectural block diagram of one embodiment of a route evaluation system.

Referring now to FIG. 1, a route evaluation system 10 generally includes a computer 20 connected to a display/interface device 22 and having a memory 24. The memory 24 contains a database 26 and a software program 28. The software program 28, which is executable by a processor 21 of the computer 20, accepts user inputs via the display/interface device 22 and accesses the database 26 in order to determine a route for the user. In accordance with the disclosed example, the database 26 includes roadway data from a commercial roadway database. The database 26 may provide routes over highways and many major roads and map data specific to local area roads not included in the commercial roadway database. The roadway data retrieved from the database 26 may include, but is not limited to, geodetic street coordinates, associated shape geometry, road class, lane count and lane width.

Figure 2:
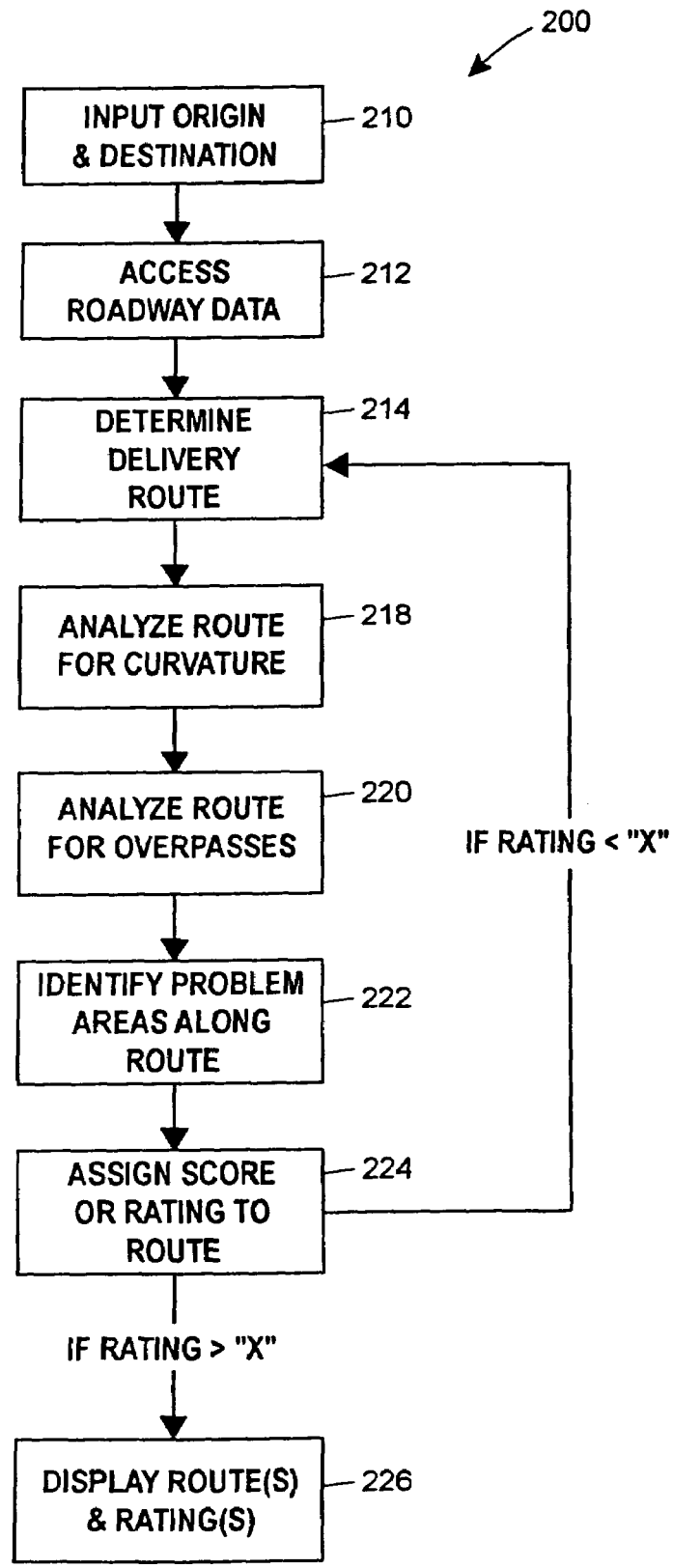
FIG. 2 is a logic diagram that may be used by the route evaluation system of FIG. 1.

FIG. 2 illustrates a logic diagram 200 which may be used by the software program 28 to determine a route from an ORIGIN to a DESTINATION based on user inputs at 210 via the display/interface device 22 of FIG. 1. After the user has input the ORIGIN and the DESTINATION, the user may also input vehicle maneuverability parameters at 210, which include, but are not limited to, a weight of the vehicle, a turning radius of the vehicle, a maximum road grade navigable by the vehicle, etc. The software program 28 then retrieves roadway data at 212 from the database 26. After accessing the database 26, the software program 28 determines a route from the ORIGIN to the DESTINATION at 214 using the roadway data from the database 26 and an optimization routine (not shown) that may include optimizing time of travel, distance, or any other parameter as determined by the user.

Once the route from the ORIGIN to the DESTINATION is determined, the software program 28 analyzes the route for navigation parameters at 218, 220. In the example of FIG. 2, these navigation parameters include, but are not limited to, the curvature of the route or the curvature of selected portions of the route, and the presence or absence of roadway or railway overpasses. A more detailed listing of exemplary navigation parameters is further discussed with reference to FIG. 7. Problem areas or areas which may be difficult for the vehicle to navigate are graphically and/or textually identified at 222. After analyzing the route with respect to the navigability parameters and identifying problem areas, a score or rating is assigned to the route at 224 based on the navigability parameters. If the score or rating is below a certain predetermined threshold value, the software program 28 determines another route at 214. The second route is analyzed as discussed above at 218, 220, 222 and 224. This process is repeated until a route is found having an acceptable score or rating (i.e., the score or rating exceeds the predetermined value). Once a route has been found with an acceptable score or rating, each route that was evaluated is returned at 226 to the display/interface device 22.

Alternatively, in another embodiment, the software program 28 creates a number of possible routes, and then, as outlined above assigns a score or rating to each route. This may be an alternative to, or in addition to, iteratively analyzing routes until the route score or rating exceeds the predetermined threshold value. For example, the software program 28 repeats the steps at 214, 218, 220, 222 and 224 for three possible routes with their corresponding scores or ratings returned at 226. The number of routes returned preferably is selectable and/or pre-programmable by the user.

Figure 3:
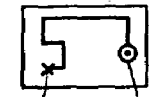
FIG. 3 is one example of a display illustrating one possible combination of routes and route information returned by the route evaluation system of FIG. 1.
Figure 3:
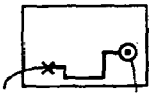
Figure 3:

FIG. 3 illustrates one possible embodiment of a display 300 which the software program 28 may employ in returning the routes analyzed at 218-224 (of FIG. 2) for user viewing. The display 300 includes several columns (310, 320, 330, 340, 350 and 360) which correspond to different characteristics of the routes analyzed. The route column 310 displays a number of the route that was analyzed. In the display 300 of FIG. 3, the routes are shown in order of highest score (or rating). However, the user may select any order of display; for example, the user may request that the routes be shown according to time of travel, not score. Regardless, the route number in the route number column 310 distinguishes one route from another.

The route description column 320 may include a brief written description of the route. Alternatively, the user may request a complete written description of the route for display in the route description column 320. Regardless, the information in the route description column 320 may include, but not be limited to, roadway names and turn directions among other information. Preferably, the route description is detailed enough for a user with some local area knowledge to determine the general route direction from the written description.

The score column 330 provides the overall score or rating of the route based on the route navigation parameters. The navigation parameters may be weighted differently according to the user's preferences. The score column 330 provides a quick comparison of the routes.

The map column 340 provides a graphical depiction of the route. The map in the map column 340 is selectable by the user to show a full depiction of the map should the user wish to view a more detailed version of the route. Alternatively, the user may elect to show a partial or full depiction of a selected portion of the route.

The distance column 350 displays the total distance from the ORIGIN 342 to the DESTINATION 344 along the route. The time column 360 displays an estimated travel time indicative of the time required to travel the route from the ORIGIN 342 to the DESTINATION 344. The estimated travel in the time column 360 is based on the total distance of the route and average travel speeds for each segment of the route. For example, the average speed a vehicle is expected to maintain on an interstate highway may be approximately 65 miles per hour, while the average speed a vehicle is expected to maintain on a city street may only be approximately 30 miles per hour. By taking into account each segment's distance and average speed, the software program 28 calculates the estimated travel time from the ORIGIN 342 to the DESTINATION 344.

Figure 4:
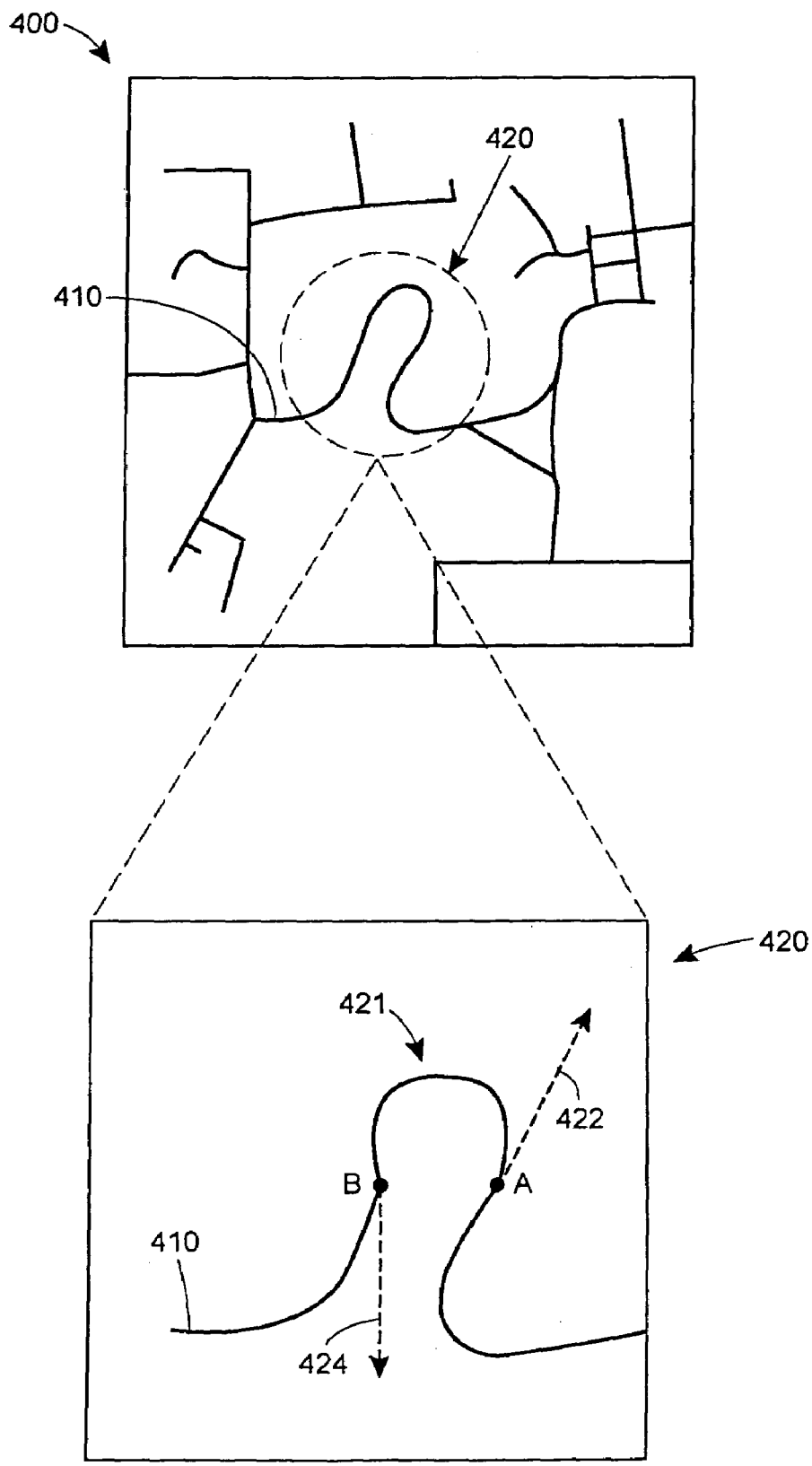
FIG. 4 graphically illustrates a portion of a route and an example of how a heading change may be based on the heading at points A and B and the distance between points A and B.

As discussed above with reference to FIG. 2 at 218, the route evaluation system checks a route for certain navigation parameters, one of which may be a heading change and, more specifically a total heading change as a function of distance traveled. FIG. 4 describes how the route evaluation system checks a portion of the route for the amount of heading change in a given distance. A typical roadmap display 400 is illustrated in FIG. 4. Assuming the road 410 has initially been chosen as part of the route, it is checked for heading change with respect to distance traveled, particularly in a selected portion 420 of the route, such as the curved region 421. In the lower part of FIG. 4, a magnified view of the selected portion 420 including the curved region 421 is shown. The route evaluation system checks for curvature by selecting a beginning point A for the curve and an ending point B for the curve. The route evaluation system then computes a line 422 which is tangent to the curve at point A, and this line 422 represents a heading for a vehicle entering the curved region 421. The route evaluation system similarly computes a line 424 which is tangent to the curve at point B, and this line 424 represents the heading of a vehicle exiting the curved region 421. The route evaluation system may use roadway specific data from the database 26, such as, for example, geodetic street coordinates or associated shape geometry, in the curvature calculations.

By computing the difference in vehicle heading at point A (represented by line 422) and the vehicle heading at point B (represented by the line 424), the route evaluation system determines a heading change between entry and exit of the curved portion 421. Further, the route evaluation system computes, or otherwise has access to, the distance between the entry point A and the exit point B. With these two values, the route evaluation system computes a navigation parameter called "heading change per distance traveled." The process described above may be iteratively repeated for a plurality of points along the curved region 421. Also, the entire route. may be evaluated for curvature until the most restrictive value of the parameter "heading change per distance traveled" has been determined. Alternatively, the route evaluation system may determine all points along the route where the parameter "heading change per distance traveled" exceeds a predetermined value which may be selected by the user and which may be based on vehicle maneuverability parameters. Further, after determining the point(s) or area(s) along a route at which the comparison between the navigation parameter(s) and the vehicle maneuverability parameter(s) indicates a problem, the route evaluation system may highlight such regions graphically and/or textually.

Figure 5:
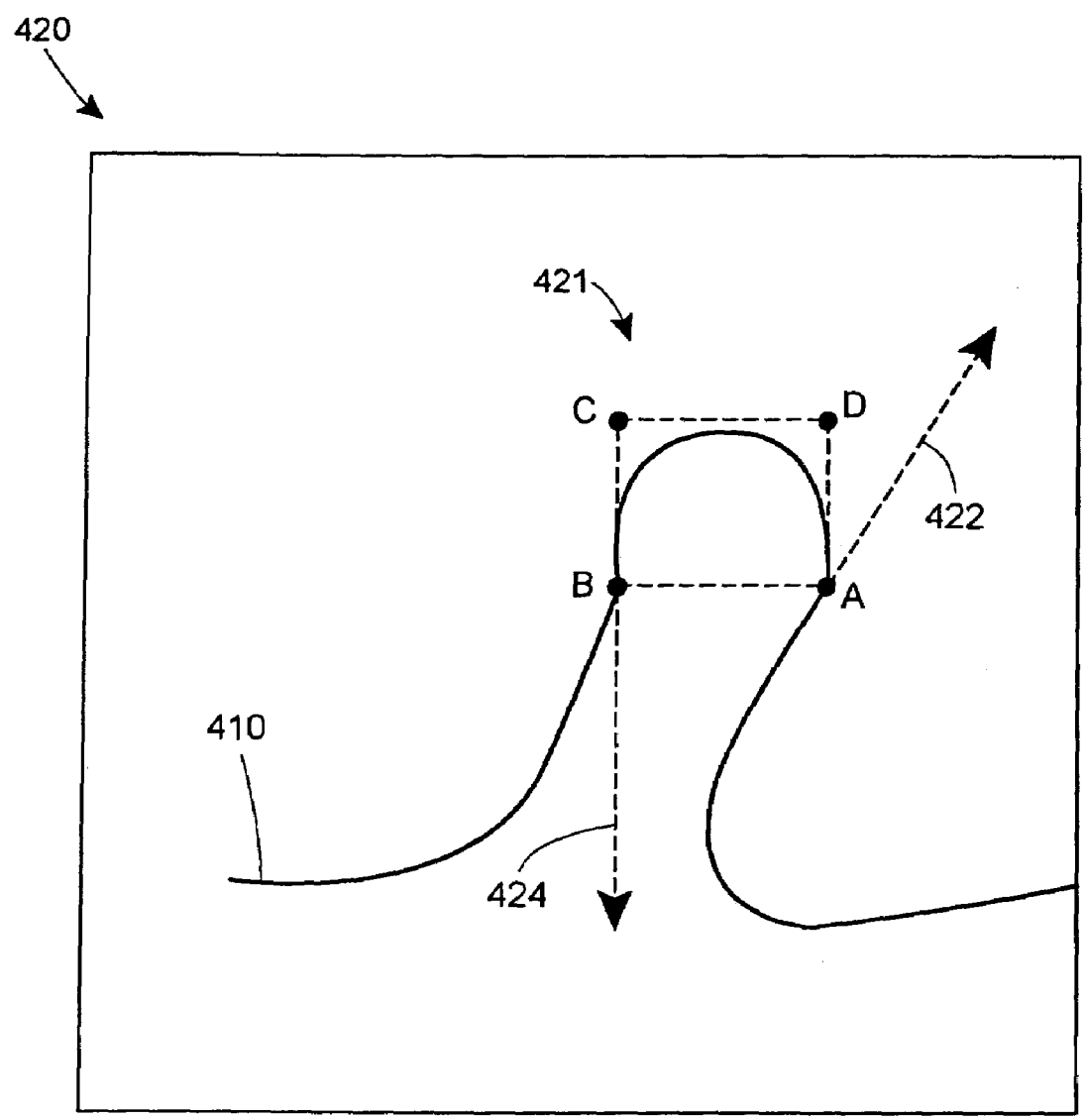
FIG. 5 graphically illustrates a portion of a route and an example of how a heading change may be based on an area ratio bounded by points A, B, C & D.

Another navigation parameter which the route evaluation system checks for is "heading change per area" as illustrated in FIG. 5. Vehicle heading at the turn entry point A and at the turn exit point B are determined in a manner similar to the manner described above. Additionally, two points C and D are also used to calculate an area in which the entire section of the route between points A and B is contained. Points C and D may be determined by a line which is tangent to the curved portion 421 and parallel to the line defined by points A and B. Although the area depicted in FIG. 5 is essentially rectangular in shape, any polygon shape may be used to calculate the area within which the heading change takes place. The number of additional points required is dependent upon the shape of the polygon chosen. The route evaluation system calculates the heading change from point A to point B and divides by the area contained within the polygon defined by points A, B, C and D. As described above, in relation to FIG. 4, the process may be iteratively repeated for a plurality of points along the route until the most constraining value of "heading change per area" is determined. Alternatively, each instance of "heading change per area" exceeding a certain predetermined threshold, as selected by the user, along the route may be returned for display on the display/interface device 22.

Figure 6:
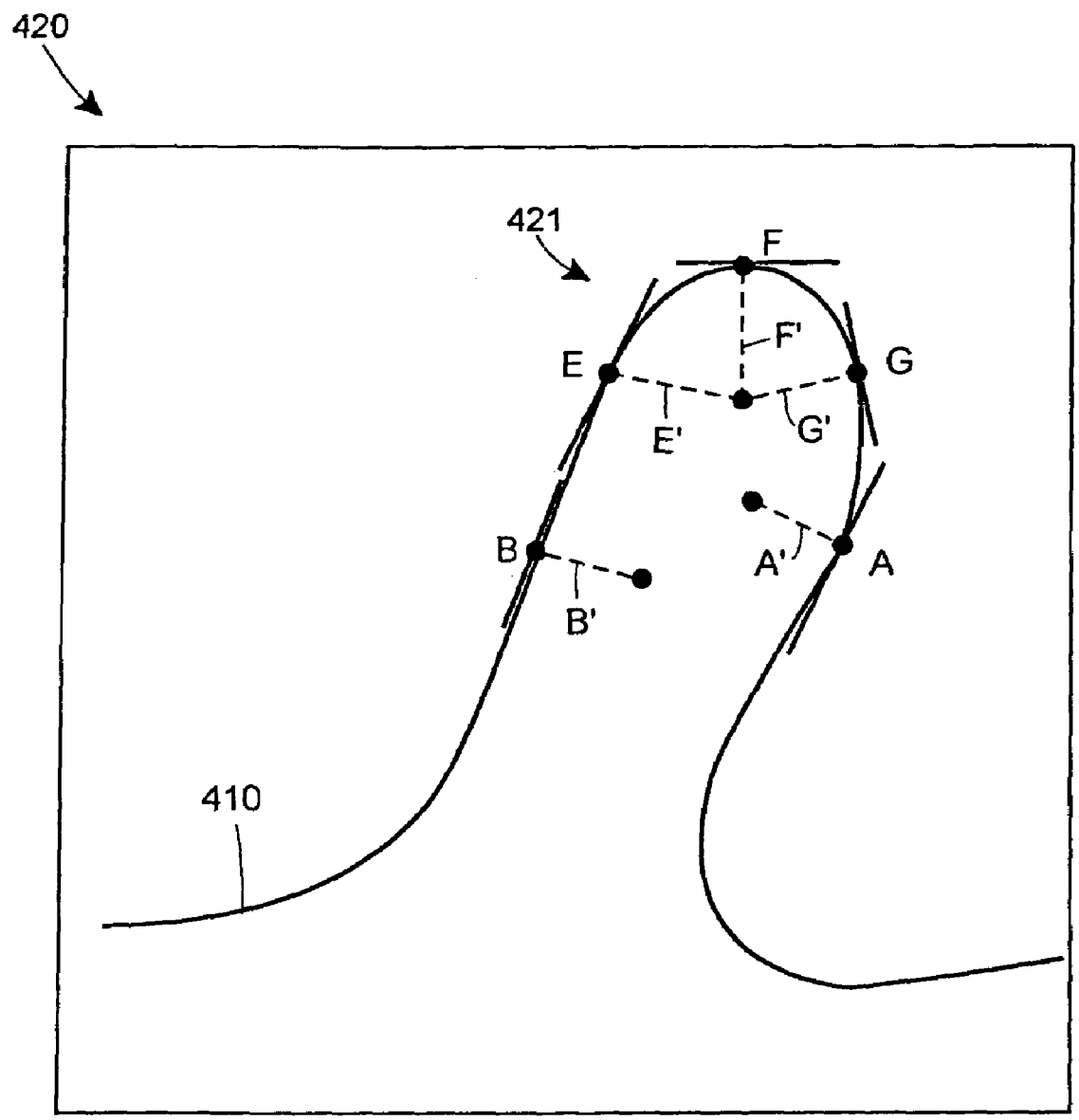
FIG. 6 graphically illustrates a portion of a route and minimum sustained radius of curvature.

Another navigation parameter that may be determined for the curved portion 420 of the route is the minimum radius of curvature. Referring now to FIG. 6, the route evaluation system calculates lines A, B, E, F and G which are tangent to the curved portion 421 of the route at a plurality of points along the curved portion 421 of the route. The route evaluation system then calculates radii A', B', E', F' and G' which correspond to radii of circles to which the lines A, B, E, F and G respectively, are tangent. The route evaluation system may use any acceptable method for calculating the radii. One such example is to use the following equation:

$$\rho = \frac{\left[1 + \left(\frac{dy}{dx}\right)^2\right]}{\frac{d^2y}{dx^2}}$$

where $\rho$=the radius of curvature, y and x are the Cartesian co-ordinates at the selected point A, B, E, F or G, and $$\frac{dy}{dx}$$

and $$\frac{d^2y}{dx^2}$$

are various derivatives of a function of a curve at the desired point A, B, E, F, or G. Of course, one skilled in the art can determine alternate methods of calculating the radii A', B', E', F' and G'.

Once the radii A', B', E', F' and G' are calculated, the route evaluation system determines which radius is smallest and assigns it as the controlling minimum turn radius for the curved portion 421 of the route. Alternatively, the route evaluation system may return any radius below a threshold value, selectable by the user, to the display/interface device 22. For example, a vehicle has a known minimum turning radius, and using known mathematical principles one can readily determine whether the calculated minimum radius if curvature is within the vehicle maneuverability parameter (e.g., the minimum turning radius) for that particular vehicle. Additionally, the minimum radius of curvature may be greater than, but only marginally greater than, the vehicle's known minimum turning radius, creating a certain margin of error for the curved portion 421 of the route. The vehicle operator and/or dispatcher may determine whether the vehicle operator has the necessary skill to complete the chosen route within the margin of error as identified by the system. In this way, the system may check the route in an objective manner and a subjective manner. Objectively, the system identifies portions of the route which are physically impossible for the vehicle to complete (e.g., the minimum radius of curvature is less than the vehicle's minimum turning radius) and subjectively, the system identifies portions of the route which satisfy the vehicle maneuverability parameters, but may require an experienced vehicle operator to navigate the route (e.g., the minimum radius of curvature is within 10 percent of the minimum turning radius of the vehicle).

Referring momentarily back to FIG. 2, the route evaluation system may check for overpasses on the route at 220. The route evaluation system accomplishes this check by searching the database for any roadways or railways that cross the route and further searches for overpass flags in the database. These overpass flags may be an actual symbol or value assigned to the intersection, or the route evaluation system could determine that an overpass exists at a roadway crossing if both the route and the roadway which crosses the route are not at the same elevation. Further, if the crossing roadway is at a higher elevation than the route, an overpass exists along the route and the user would be notified appropriately. In each case above, the entire route is evaluated for the navigation parameters. Because the roadway data is essentially a collection of points, which taken together represent roads, each navigation parameter is computationally evaluated at each point along the route.

Additionally, the route evaluation system may be configured to optimize other parameters. These other parameters include, but are not limited to, minimizing the number of turns in a route, prioritizing highways over arterials and arterials over collectors, road classes, lane count and/or lane width and minimizing the number of turns from one low level road to another low level road.

FIG. 7 is an exemplary listing of vehicle maneuverability parameters, each of which may have some effect on the ability of a particular vehicle to successfully navigate a route. These vehicle maneuverability parameters are examples only, and are not meant to be an all inclusive listing of all possible vehicle maneuverability parameters. FIG. 7 also includes an exemplary listing of navigation parameters. The navigation parameters are not meant to be an all inclusive list, but simply an example of possible relevant navigation parameters. It will be appreciated that those of skill in the art may become aware of additional vehicle maneuverability parameters that may bear on the ability of a particular vehicle to negotiate selected navigation parameters. Similarly, those of skill in the art may become aware of additional navigation parameters that may be relevant to certain vehicle maneuverability parameters.

Figure 8:
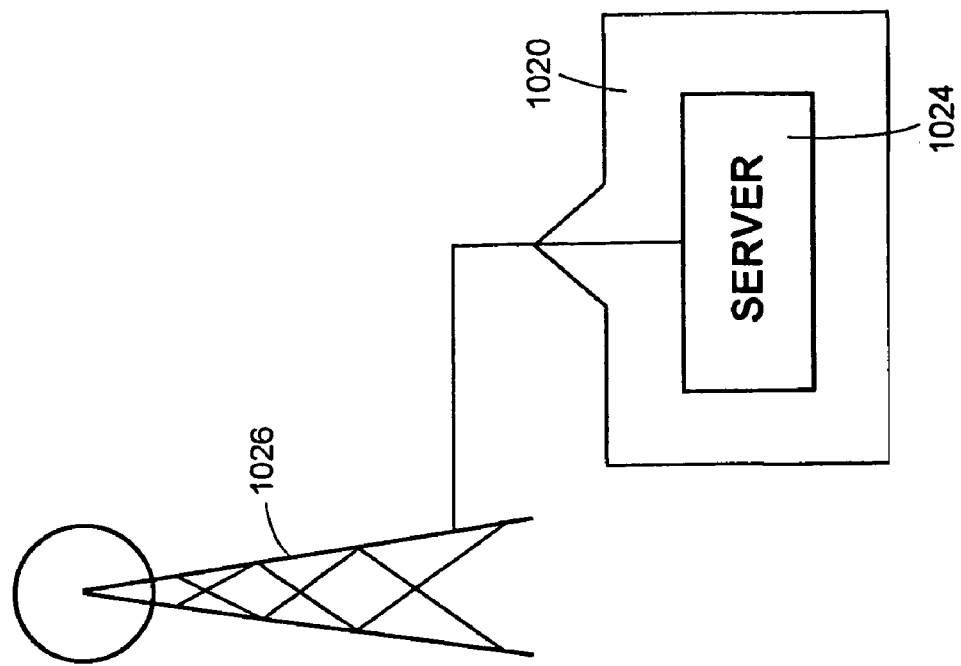
FIG. 8 is a schematic diagram of the route evaluation system of FIG. 1 interacting with a vehicle.
Figure 8:
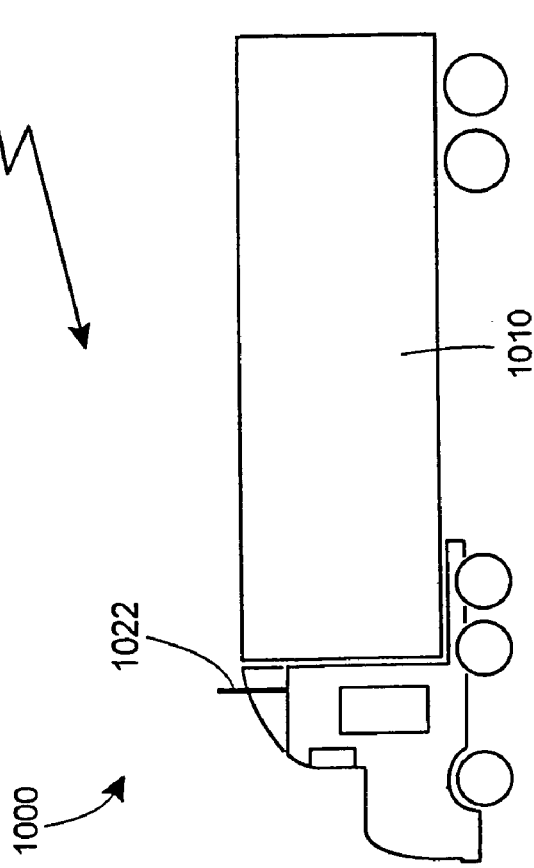

FIG. 8 is a diagram of an example shipping or delivery operation 1000. The delivery operation includes a vehicle 1010 and a dispatch facility 1020. While the vehicle 1010 depicted in FIG. 8 is a semi tractor trailer, it is understood that the vehicle 1010 may be any type of commercial or private vehicle. The vehicle 1010 includes an antenna 1022 that allows the vehicle 1010 to communicate with the dispatch facility 1020. This communication may be made through radio or other electromagnetic waves and may include an analog signal and/or a digital signal. Regardless, in the embodiment of FIG. 8, the vehicle 1010 includes a communication device (not shown) within the vehicle that allows the operator to communicate with the dispatch facility 1020 as previously mentioned. The communication device includes an input/output device which may be a display of some sort, a printer or a speaker. The input/output device allows the operator of the vehicle 1010 to input an origin and a destination and transmit the origin and destination to the dispatch facility 1020. The dispatch facility 1020 includes a computer or server 1024 of some sort which includes the route evaluation system described above. Once the computer or server 1024 has determined and analyzed the routes from the origin to the destination, the routes are transmitted back to the vehicle 1010 through the antennas 1022 and 1026 via electromagnetic waves. The operator of the vehicle 1010 may then select the best route available to the destination.

Figure 9:
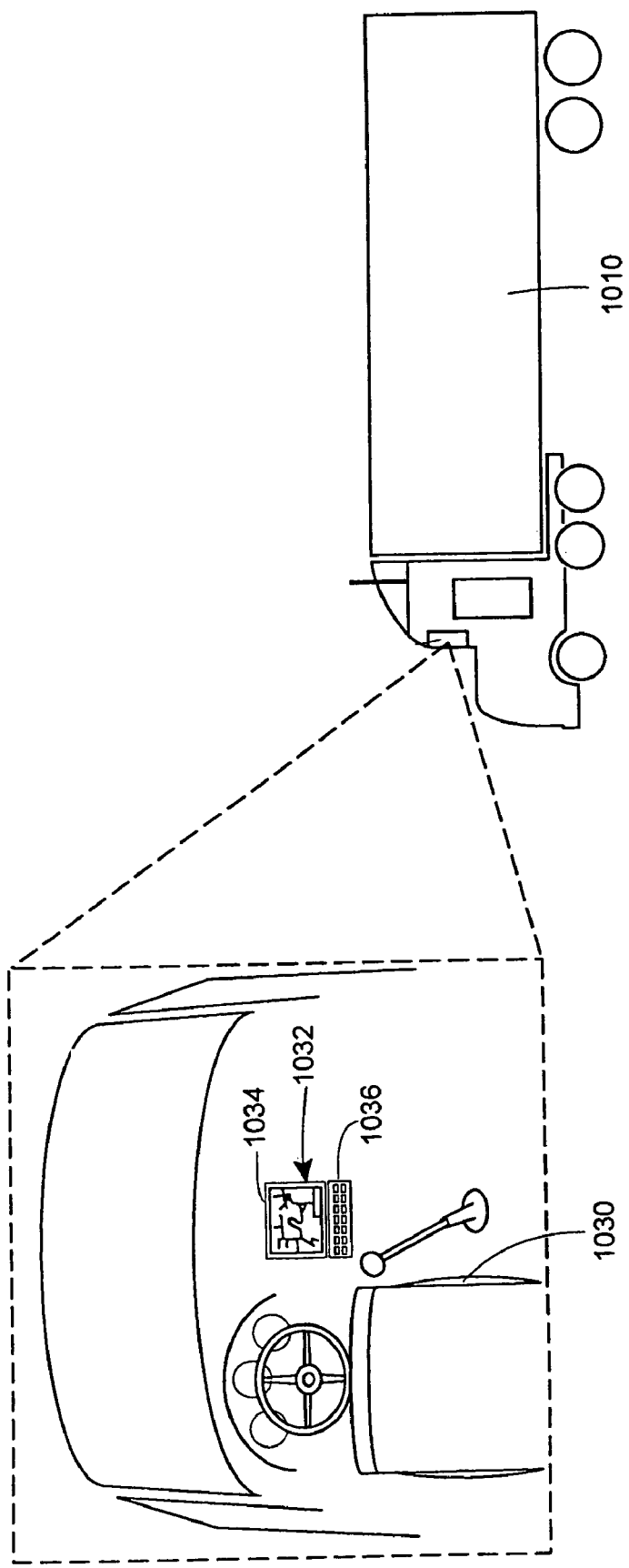
FIG. 9 is one possible location for display within a vehicle.

Alternatively, as shown in FIG. 9, the route evaluation system may be included in a computer onboard the vehicle 1010. The vehicle 1010 generally has a location 1030 for an operator and a computer system 1032 including the route evaluation system. The computer system 1032 may include a display 1034 of some sort and an input device 1036. The display 1034 may be an electronic display or a projection display. The display 1034 may include touch screen technology allowing the display 1034 to also function as the input device 1036. On the other hand, the input device may be a keyboard, a mouse or any other type of input device. The operator inputs an origin and a destination into the computer 1032 via the input device 1036. The computer 1032 determines and evaluates the routes as described above and returns the results to the display 1034 for operator viewing. The results may be displayed graphically, textually or a combination of the two. The operator of the vehicle 1010 then selects a preferable route.

In the embodiment described in FIG. 8, the dispatch facility 1020 may include a dispatcher who is responsible for asset allocation. For example, the dispatcher may be tasked with scheduling different sizes of vehicles and vehicle operators of different ability. In such operations, it may be useful for the route evaluation system to display route results in combination with asset availability. One example of such a display is illustrated in FIG. 10 and represented by the number 1100.

The display 1100 includes several columns of data. For example, a route column 1110 includes a number assigned to each route computed and analyzed by the route evaluation system. The code column 1112 includes codes for the route difficulty 1113 and equipment 1113'. In the example of FIG. 10, the codes are:

R=Red, Y=Yellow, G=Green, L=Large, S=Small,
X=Not Usable where Red, Yellow and Green are color codes which indicate relative difficulty for a particular piece of equipment, in this case a large or small truck. Column 1114 indicates what equipment is available. Column 1116 indicates what types of vehicle operators are available, for example experienced (EX) or novice (NO). Further, a legend 1118 is included at the bottom of the display 1100. The information on the display 1100 is used by the dispatcher to assign certain assets to certain routes. In this example, the dispatcher may have one large truck, one small truck, one experienced vehicle operator and one novice vehicle operator available for operations including the four routes displayed. Regarding route 2, the route evaluation system has determined that route 2 is impassable for a large truck. Therefore, the dispatcher already knows that the small truck must be assigned to this route. Other factors may influence the dispatcher's decision, such as cargo capacity of each truck and total cargo to be delivered. Further, the dispatcher may try to match the more experienced vehicle operator with the more difficult routes.

Alternatively, the route column 1110 and the code column 1112 may be transmitted directly to the vehicle operator of the vehicle. The vehicle operator may select a route based on his/her own experience. For example, a novice vehicle operator may select only green coded routes for the vehicle he/she is driving while an expert vehicle operator may select any route up to and including a red coded route for the vehicle he/she is driving. In this way, the vehicle operator may subjectively select the most appropriate route.

Although certain functions and features have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A route evaluation system comprising:
a processor operatively coupled to a memory;
a database accessible by the processor and including roadway data defining pre-existing roads pertaining to a geographical area;
one or more routines stored in the memory and executable by the processor to:
obtain selected roadway data from the database;
determine a route from an origin to a destination based at least in part on the roadway data;
compute a set of navigation parameters for the route;
compare the set of route navigation parameters to at least one vehicle maneuverability parameter of a vehicle; and
assign a route suitability score to the route based at least in part on the comparison between the set of navigation parameters and the at least one vehicle maneuverability parameter,
wherein the at least one vehicle maneuverability parameter of the vehicle corresponds to an attribute of the vehicle that affects an ability of the vehicle to successfully traverse the pre-existing roads.

2. The system of claim 1, wherein the set of route navigation parameters includes at least one parameter selected from the group consisting of a curvature parameter, a time of travel parameter and a number of turns parameter.

3. The system of claim 2, wherein the route includes a selected portion, and wherein the one or more routines are further executable to compute the curvature parameter based on a heading change within the selected portion and a distance traveled within the selected portion.

4. The system of claim 2, wherein the route includes a selected portion and wherein the one or more routines are further executable to compute the curvature parameter based on a heading change within the selected portion and an area of the selected portion.

5. The system of claim 1, wherein the set of navigation parameters includes a curvature parameter, and wherein the one or more routines are further executable to compute the curvature parameter based on a minimum radius of curvature.

6. The system of claim 1, wherein the geographical area is defined by a user.

7. The system of claim 1, wherein the geographical area is stored on a computer readable medium.

8. The system of claim 1, wherein the route includes a selected portion, and wherein the one or more routines are further executable to output a route suitability indicator selected from the group consisting of total heading change in the selected portion as a function of an area of the selected portion, total heading change in the selected portion as a function of distance traveled in the selected portion, and minimum radius of curvature in the selected portion.

9. The system of claim 1, wherein the one or more routines are further executable to determine multiple routes and assign a route suitability score to each of the multiple routes.

10. The system of claim 1, wherein the one or more routines are further executable to compare the set of route navigation parameters to a user-defined threshold value, the user-defined threshold value stored on a computer readable medium and indicative of the suitability of the route.

11. The system of claim 1, further comprising an output device coupled to the processor and configured to display the route.

12. The system of claim 11, wherein the output device is configured to display the route using at least one of a graphical route description or a textual route description.

13. The route evaluation system of claim 11, wherein the output device is configured to display the route in conjunction with an indication of the route suitability score.

14. The route evaluation system of claim 11, wherein the output device is configured to display the route in conjunction with an indication of the route suitability score when the route suitability score passes a pre-determined value corresponding to a threshold of accessibility for the vehicle.

15. The system of claim 1, wherein the roadway data includes at least one of a set of preexisting routes or a commercially available database.

16. The system of claim 1, wherein the at least one vehicle maneuverability parameter is defined by a user.

17. The system of claim 1, wherein the at least one vehicle maneuverability parameter is storable on a computer readable medium.

18. The route evaluation system of claim 1, wherein the at least one vehicle maneuverability parameter of the vehicle is at least one of: a length of the vehicle, a width of the vehicle, a height of the vehicle, a weight of the vehicle, a turning radius of the vehicle, a maximum road grade navigable by the vehicle, and a braking ability of the vehicle.

19. The route evaluation system of claim 1, wherein the route suitability score of the route indicates whether the route is usable or unusable by the vehicle.

20. The route evaluation system of claim 19, wherein the route suitability score indicates a difficulty of route traversal for the vehicle when the route is usable by the vehicle.

21. The route evaluation system of claim 20, wherein the difficulty of route traversal is color-coded.

22. A computer readable storage medium system for storing a program for use in a route evaluation system, the program comprising:
a set of vehicle maneuverability parameters stored on a first or a second computer readable medium;
a set of roadway data defining pre-existing roads stored on a third computer readable medium;
one or more routines stored on the first computer readable medium, the one or more routines executable by a processor to:
access the set of roadway data and to determine a route from an origin to a destination based on the set of roadway data;
calculate a set of route navigation parameters based on the roadway data for the route; and
assign route suitability score to the route based at least in part on a comparison between the set of route navigation parameters and at least one vehicle maneuverability parameter from the set of vehicle maneuverability parameters,
wherein each member of the set of vehicle maneuverability parameters corresponds to an attribute of a vehicle that affects an ability of the vehicle to successfully traverse the pre-existing roads.

23. The computer readable storage medium system of claim 22, wherein the set of route navigation parameters includes at least one parameter selected from the group consisting of a curvature parameter, a time of travel parameter and a number of turns parameter.

24. The computer readable storage mediums system of claim 23, wherein the route includes a selected portion, and wherein the one or more routines are further executable to compute the curvature parameter based on a heading change within the selected portion and a distance traveled within the selected portion.

25. The computer readable storage medium system of claim 23, wherein the route includes a selected portion and wherein the one or more routines are further executable to compute the curvature parameter based on a heading change within the selected portion and an area of the selected portion.

26. The computer readable storage medium system of claim 22, wherein one or more routines are further executable to compare the set of route navigation parameters to a user-defined threshold value, the user-defined threshold value stored on a computer readable medium and indicative of the suitability of the route.

27. The computer readable storage medium system of claim 22, wherein the attribute of the vehicle that affects the ability of the vehicle to successfully traverse the determined route is one of: a length of the vehicle, a width of the vehicle, a height of the vehicle, a weight of the vehicle, a turning radius of the vehicle, a maximum road grade navigable by the vehicle, or a braking ability of the vehicle.

28. The computer readable storage medium system of claim 22, wherein the route suitability score of the route indicates whether the route is usable or unusable by the vehicle.

29. A computer readable storage medium storing a program for use in a route evaluation system, the program comprising one or more routines stored on the computer readable storage medium and executable by a processor to:
   access a set of roadway data defining pre-existing roads stored in a database;
   determine a route from an origin to a destination based on the set of roadway data;
   determine a set of route navigation parameters based on the set of roadway data pertaining to the route, the set of route navigation parameters indicative of a suitability of the route for use by a vehicle having at least one vehicle maneuverability parameter; and
   assign a route suitability score to the route based at least in part on a comparison between the set of route navigation parameters and the at least one vehicle maneuverability parameter,
   wherein the at least one vehicle maneuverability parameter corresponds to an attribute of the vehicle that affects an ability of the vehicle to successfully traverse the pre-existing roads.

30. The computer readable storage medium of claim 29, wherein the set of roadway data includes at least one element selected from the group consisting of a geodetic street coordinate, associated shape geometry, road class, lane count, lane width and turn direction.

31. The computer readable storage medium of claim 29, wherein the set of route navigation parameters includes at least one parameter selected from the group consisting of a curvature parameter, a time of travel parameter and a number of turns parameter.

32. The computer readable storage medium of claim 31, wherein the route includes a selected portion, and wherein the one or more routines are further executable to compute the curvature parameter based on a heading change within the selected portion and a distance traveled within the selected portion.

33. The computer readable storage medium of claim 31, wherein the route includes a selected portion and wherein the one or more routines are further executable to compute the curvature parameter based on a heading change within the selected portion and an area of the selected portion.

34. The computer readable storage medium of claim 29, wherein the one or more routines are further executable to
   compare the set of route navigation parameters to a user-defined threshold value, the user-defined threshold value stored on the computer readable medium and indicative of a suitability of the route.

35. The computer readable storage medium of claim 29, wherein the attribute of the vehicle that affects the ability of the vehicle to successfully traverse the determined route is one of: a length of the vehicle, a width of the vehicle, a height of the vehicle, a weight of the vehicle, a turning radius of the vehicle, a maximum road grade navigable by the vehicle, or a braking ability of the vehicle.

36. The computer readable storage medium of claim 29, wherein the route suitability score of the route indicates whether the route is suitable or unsuitable for use by the vehicle.

37. A system comprising:
   a vehicle;
   a processor operatively coupled to a memory;
   a set of roadway data defining pre-existing roads stored on a first computer readable medium;
   one or more routines stored on a second computer readable medium, the one or more routines executable by the computer to: obtain selected roadway data from the set of roadway data;
   determine a route from an origin to destination based at least in part on the selected roadway data;
   compute a set of navigation parameters for the route;
   compare the set of navigation parameters to at least one vehicle maneuverability parameter of the vehicle; and
   assign a route suitability score to the route based at least in part on the comparison between the set of navigation parameters and the at least one vehicle maneuverability parameter,
   wherein the at least one vehicle maneuverability parameter of the vehicle corresponds to an attribute of the vehicle that affects an ability of the vehicle to successfully traverse the pre-existing roads,
   and wherein the vehicle also includes a communication device adapted to communicate with the processor.

38. The system of claim 37, wherein the set of route navigation parameters includes at least one parameter selected from the group consisting of a curvature parameter, a time of travel parameter and a number of turns parameter.

39. The system of claim 38, wherein the route includes a selected portion, and wherein the one or more routines are further executable to compute the curvature parameter based on a heading change within the selected portion and a distance traveled within the selected portion.

40. The system of claim 38, wherein the route includes a selected portion and wherein the one or more routines are further executable to compute the curvature parameter based on a heading change within the selected portion and an area of the selected portion.

41. The system of claim 37, wherein the set of navigation parameters includes a curvature parameter and wherein the one or more routines are further executable to compute the curvature parameter based on a minimum radius of curvature.

42. The system of claim 37, wherein the at least one vehicle maneuverability parameter of the vehicle is at least one of: a length of the vehicle, a width of the vehicle, a height of the vehicle, a weight of the vehicle, a turning radius of the vehicle, a maximum road grade navigable by the vehicle, and a braking ability of the vehicle.

43. The system of claim 37, wherein the route suitability score of the route indicates whether the route is suitable or unsuitable for the vehicle.

44. A dispatch system comprising:
   a processor operatively coupled to a memory;
   a communication device operatively coupled to the processor and adapted to communicate with a vehicle;
   a set of roadway data defining pre-existing roads stored on a first computer readable medium;
   one or more routines stored on a second computer readable medium, the one or more routines executable to:
   obtain selected roadway data from the set of roadway data;
   determine a route from an origin to a destination based at least in part on the selected roadway data;
   compute a set of navigation parameters for the route;
   compare the set of navigation parameters to at least one vehicle maneuverability parameter of the vehicle; and
   assign a route suitability score to the route based at least in part on the comparison between the set of navigation parameters and the at least one vehicle maneuverability parameter,
   wherein the at least one vehicle maneuverability parameter of the vehicle corresponds to an attribute of the vehicle that affects an ability of the vehicle to successfully traverse the pre-existing roads.

45. The system of claim 44, wherein the set of route navigation parameters includes at least one parameter selected from the group consisting of a curvature parameter, a time of travel parameter and a number of turns parameter.

46. The system of claim 45, wherein the route includes a selected portion, and wherein the one or more routines are further executable to compute the curvature parameter based on a heading change within the selected portion and a distance traveled within the selected portion.

47. The system of claim 45, wherein the route includes a selected portion and wherein the one or more routines are further executable to compute the curvature parameter based on a heading change within the selected portion and an area of the selected portion.

48. The system of claim 44, wherein the set of navigation parameters includes a curvature parameter and wherein the one or more routines are further executable to direct the processor to compute the curvature parameter based on a minimum radius of curvature.

49. The dispatch system of claim 44, wherein the processor is not co-located with the vehicle.

50. The system of claim 44, wherein the at least one vehicle maneuverability parameter of the vehicle is at least one of: a length of the vehicle, a width of the vehicle, a height of the vehicle, a weight of the vehicle, a turning radius of the vehicle, a maximum road grade navigable by the vehicle, and a braking ability of the vehicle.

51. The system of claim 44, wherein the route suitability score of the route indicates whether the route is suitable or unsuitable for the vehicle.

52. The dispatch system of claim 44, wherein the one or more routines are further executable to display an indication of the route suitability score in conjunction with an indication of the route.

53. The dispatch system of claim 44, wherein the one or more routines are further executable to:
determine multiple routes;
assign a route suitability score to each of the multiple routes; and
display an indication of each of the multiple routes in conjunction with an indication of a corresponding route suitability score.

54. A method of evaluating a route comprising, using a computing device:
defining a geographical area;
retrieving roadway data defining pre-existing roads from a database for the geographical area;
creating a route from an origin to a destination within the geographical area using the retrieved roadway data;
evaluating a navigation parameter of the route;
comparing the navigation parameter of the route to a vehicle maneuverability parameter of a vehicle, and
assigning a route suitability score to the route based at least in art on the comparison between the navigation parameter and the vehicle maneuverability parameter,
wherein the vehicle maneuverability parameter of the vehicle corresponds to an attribute of the vehicle that affects an ability of the vehicle to successfully traverse the pre-existing roads.

55. The method of claim 54, wherein the navigation parameter is selected from the group consisting of a curvature parameter, a time of travel parameter and a number of turns parameter.

56. The method of claim 55, further including defining a selected portion of the route and computing the curvature parameter based on a heading change within the selected portion of the route and a distance traveled within the selected portion of the route.

57. The method of claim 55, further including defining a selected portion of the route and computing the curvature parameter based on a heading change within the selected portion of the route and an area of the selected portion of the route.

58. The method of claim 55, further including defining a selected portion of the route and computing the curvature parameter based on a minimum radius of curvature of the selected portion of the route.

59. The method of claim 54, further including comparing the route navigation parameter to a user-defined threshold value that is indicative of a suitability of the route.

60. The method of claim 54, wherein the attribute of the vehicle that affects the ability of the vehicle to successfully traverse the created route is one of: a length of the vehicle, a width of the vehicle, a height of the vehicle, a weight of the vehicle, a turning radius of the vehicle, a maximum road grade navigable by the vehicle, or a braking ability of the vehicle.

61. The method of claim 54, wherein assigning the route suitability score to the route comprises assigning an indication of whether the route is suitable or unsuitable for the vehicle.

62. The method of claim 61, wherein assigning an indication that the route is suitable for the vehicle comprises assigning an indication of a difficulty level of route traversal for the vehicle.

63. The method of claim 54, further comprising displaying the route and an indication of the route suitability score.

64. The method of claim 63, wherein displaying the indication of the route suitability score comprises displaying the indication of the route suitability score using a color code.

65. The method of claim 63, wherein displaying the route and the indication of the route suitability score comprises displaying the route and the indication of the route suitability score when the route suitability score passes a predetermined value corresponding to a threshold of accessibility for the vehicle.

66. A method of evaluating a route, comprising, on a computing device:
obtaining a route from an origin to a destination within a geographical area;
obtaining a navigation parameter of the route;
comparing the navigation parameter of the route to a vehicle maneuverability parameter of a vehicle wherein the vehicle maneuverability parameter corresponds to an attribute of the vehicle that affects an ability of the vehicle to successfully traverse pre-existing roads; and
assigning a route suitability score to the route based at least in part on the comparison between the navigation parameter and the vehicle maneuverability parameter.

67. The method of claim 66, further comprising displaying the route and an indication of the route suitability score on a display device.

68. The method of claim 67, wherein displaying the route and the indication of the route suitability score comprises displaying the route and the indication of the route suitability score when the route suitability score passes a predetermined value corresponding to a threshold of accessibility for the vehicle.

69. The method of claim 66, further comprising communicating the route suitability score to another computing device.

70. The method of claim 66, wherein obtaining the navigation parameter comprises obtaining at least one of: a curvature parameter, a time of travel parameter and a number of turns parameter.

71. The method of claim 66, wherein the attribute of the vehicle that affects an ability of the vehicle to successfully traverse pre-existing roads is at least one of: a length of the vehicle, a width of the vehicle, a height of the vehicle, a weight of the vehicle, a turning radius of the vehicle, a maximum road grade navigable by the vehicle, or a braking ability of the vehicle.

72. The method of claim 66, further comprising comparing the navigation parameter to a user-defined threshold value that is indicative of a suitability of the route and assigning the route suitability score to the route further based on the comparison of the navigation parameter to the user-defined threshold value.

73. The method of claim 66, further comprising obtaining, based on user input, at least one of: the route, the geographical area, or the vehicle maneuverability parameter.

74. The method of claim 66, wherein assigning the route suitability score to the route comprises assigning an indication of whether the route is suitable or unsuitable for the vehicle.

* * * * *

UNITED STATES PATENT AND TRADEMARK OFFICE
CERTIFICATE OF CORRECTION

PATENT NO. : 7,580,791 B2 Page 1 of 1
APPLICATION NO. : 11/200975
DATED : August 25, 2009
INVENTOR(S) : Peter Froeberg It is certified that error appears in the above-identified patent and that said Letters Patent is hereby corrected as shown below:

In the Claims:

At Column 13, line 56, "art" should be -- part --.

Signed and Sealed this

Fourth Day of May, 2010

David J. Kappos
*Director of the United States Patent and Trademark Office*